Patented Feb. 17, 1953

2,628,973

UNITED STATES PATENT OFFICE 2,628,973

ARYLOXYACETATES OF BASICALLY SUBSTITUTED ARYLALKANOLS AND DERIVATIVES THEREOF

John W. Cusic, Skokie, Ill., assignor to G. D. Searle & Co., Chicago, Ill., a corporation of Illinois No Drawing. Application February 24, 1951, Serial No. 212,679

15 Claims. (Cl. 260—473)

1

The present invention is concerned with a new type of ester of aryloxyacetic acids and specifically with those of basically substituted arylalkanols, and salts thereof.

These esters may be represented by the structural formula

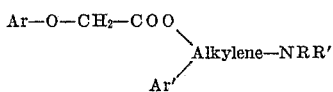

wherein Ar and Ar' are aromatic radicals and NRR' is a member of the class comprising dialkylamino radicals and nitrogen-containing heteromonocyclic radicals attached to the alkylene radical through a nitrogen in the heteromonocycle and salts thereof.

In the foregoing structural formula, Ar and Ar' represent such aromatic radicals as phenyl, tolyl, naphthyl, fluorenyl, phenanthryl and substitution products thereof such as the halogen and methoxy derivatives. The alkylene radical represents bivalent, saturated, aliphatic hydrocarbon radicals of from two to eight carbon atoms. These radicals are derived from straight-chain and branched-chain aliphatic hydrocarbons and include radicals such as ethylene, propylene, butylene, amylene and polymethylene radicals such as trimethylene, tetramethylene, pentamethylene and hexamethylene.

Among the radicals which R and R' may represent are such lower alkyl groups as methyl, ethyl, propyl, butyl, amyl, and hexyl, wherein the propyl, butyl, amyl, and hexyl groups may be either of the straight-chain or branched-chain type. The radical NRR' may also be a nitrogen-containing heteromonocyclic radical such as N-piperidino, N-lupetidino, N-pyrrolidino, N-morpholino, N-thiamorpholino, N-piperazino, N'-alkyl-N-piperazino and the like.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzene sulfonate, ethyl toluene sulfonate, ethylene chlorohydrin, propylene chlorohydrin, allyl bromide, methallyl bromide and crotyl bromide.

2

The above esters are conveniently prepared by heating an aryloxyacetyl halide with a corresponding alcohol of the type

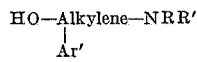

wherein all symbols are defined as hereinabove, under anhydrous conditions in an inert solvent such as a lower aromatic hydrocarbon.

The esters of this invention are valuable intermediates in organic synthesis. They have been found to possess useful pharmacodynamic properties upon the renal excretory system, and to have particular utility as diuretic agents.

My invention will be described more fully in conjunction with the following examples. It will be understood, however, that these examples are given by way of illustration only, and that the invention is not to be construed as limited in spirit or in scope by the details set forth. It will be apparent to chemists skilled in the art of organic synthesis that many modifications in materials, conditions and methods may be made without departing from the invention. In each of these examples, temperatures are given uncorrected in degrees centigrade (°C.), amounts of materials in parts by weight, and pressures during vacuum distillation in millimeters (mm.) of mercury.

EXAMPLE 1

*Phenoxyacetate of α-diethylaminomethylbenzyl alcohol*

A mixture of 170 parts of phenoxyacetyl chloride and α-diethylaminomethylbenzyl alcohol in 2600 parts of benzene is heated at refluxing temperature for fifteen hours with constant agitation. Upon cooling a precipitate forms. The mixture is treated with dilute, aqueous hydrochloric acid. The aqueous layer is separated and rendered alkaline by addition of sodium hydroxide. The base is extracted with ether, and the ether extract is dried over anhydrous potassium carbonate, filtered, and evaporated. The phenoxyacetate of α-diethylaminomethylbenzyl alcohol is distilled at 1 mm. pressure and about 185–188° C. An ether solution of the base is treated with a 25% solution of hydrogen chloride in anhydrous isopropanol. The crystalline hydrochloride solidifies readily. Recrystallized from isopropanol, it melts at about 127–129° C. The base has the structural formula

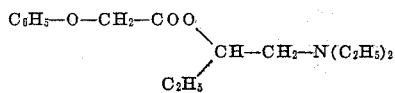

EXAMPLE 2 o-Chlorophenoxyacetate of α-diethylaminomethylbenzyl alcohol 205 parts of o-chlorophenoxyacetyl chloride and 193 parts of α-diethylaminomethyl benzyl alcohol in 2600 parts of benzene are heated at refluxing temperature for fifteen hours with constant agitation. No precipitate forms in this case. The mixture is treated with dilute, aqueous hydrochloric acid, and the acid layer is separated and rendered alkaline by addition of dilute ammonium hydroxide. The base is extracted with ether and the ether extract dried over anhydrous potassium carbonate, filtered and evaporated. The o-chlorophenoxyacetate of α-diethylaminomethylbenzyl alcohol is distilled at 2 mm. pressure and about 205° C.

EXAMPLE 3 o,p-Dichlorophenoxyacetate of α-diethylaminomethylbenzyl alcohol

A mixture of 239 parts of o,p-dichlorophenoxyacetic acid and 193 parts of α-diethylaminomethyl benzyl alcohol and 2600 parts of benzene is stirred and heated at refluxing temperature for fifteen hours. The resulting solution is treated with aqueous hydrochloric acid. The aqueous layer is separated and the base liberated by treatment with potassium hydroxide. The base is extracted with ether and the extract dried over anhydrous potassium carbonate, filtered, and evaporated. The o,p-dichlorophenoxyacetate of α-diethylaminomethylbenzyl alcohol boils at 214–216° C. at 2 mm. pressure. An ether solution of this compound is treated with an equivalent of alcoholic hydrogen chloride. The hydrochloride precipitates upon standing at 0° C. Recrystallization from isopropanol yields crystals melting at about 151–153° C.

EXAMPLE 4 o,p-Dichlorophenoxyacetate of (β-hydroxy-β-phenethyl) diethylmethylammonium iodide A solution of 100 parts of o,p-dichlorophenoxyacetate of α-diethylaminomethylbenzyl alcohol and 100 parts of methyl iodide in 400 parts of butanone is stirred at 0° C. for twelve hours. Addition of a small amount of ether causes separation of an oily precipitate which solidifies on standing at 0° C. for several days. It is collected on a filter and warmed with butanone to dissolve the oil. Upon cooling and storage at 0° C., a precipitate forms which is collected on a filter. The o,p-dichlorophenoxyacetate of (β-hydroxy-β-phenethyl) diethylmethylammonium iodide melts at about 131–133° C. and has the structural formula

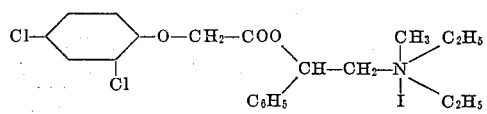

EXAMPLE 5 o-Anisyloxyacetate of α-(2-phenanthryl)-4-morpholinepropanol

A mixture of 201 parts of o-methoxyphenoxyacetyl chloride and 321 parts of α-(2-phenanthryl)-4-morpholinepropanol (cf. E. Mosettig, et al. J. A. C. S. 60, 2464; 1938) in 4500 parts of benzene is stirred and heated at refluxing temperature for fifteen hours. The mixture is then treated with aqueous hydrochloric acid, the aqueous layer separated, rendered alkaline by addition of dilute ammonium hydroxide, and extracted with ether. The extract is dried over anhydrous potassium carbonate, stirred with decolorizing charcoal and filtered. Evaporation of the filtrate yields the o-anisyloxyacetate of α-(2-phenanthryl)-4-morpholinepropanol as a light yellow oil. This compound has the structural formula

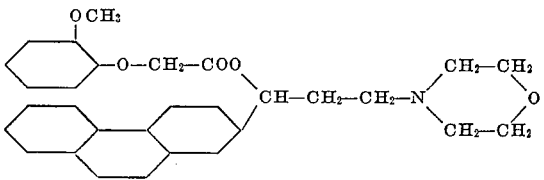

EXAMPLE 6

β-Naphthoxyacetate of α-(3,4-methylenedioxyphenyl)-1-piperidinebutanol 277 parts of α-(3,4-methylenedioxyphenyl)-1-piperidinebutanol, prepared by the method of A. Marxer (Helv. Chim. A., 24; 209E; 1941) are heated at refluxing temperature with 221 parts of 2-naphthoxyacetyl chloride in 5000 parts of benzene with constant agitation for twelve hours. After cooling, the reaction mixture is treated with aqueous hydrochloric acid and the aqueous layer made alkaline by addition of dilute potassium hydroxide and extracted with ether. The extract is dried over anhydrous potassium carbonate and filtered with the use of charcoal as a clarifying agent. Upon evaporation, the base is obtained as a light-colored oil. To prepare the methobromide, 100 parts of this base are heated for two hours with 50 parts of methyl bromide in 400 parts of butanone in a shielded pressure vessel. After cooling and treatment with ether, an oil separates which solidifies upon storage at 0° C. It has the structural formula

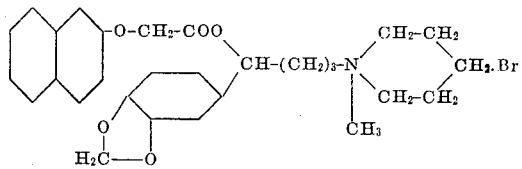

I claim:

1. The group of organic compounds consisting of the aryloxyacetates of basically substituted arylalkanols of the structural formula

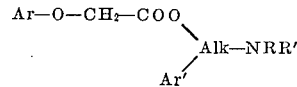

and salts thereof, wherein Ar and Ar' are members of the class consisting of aryl hydrocarbon radicals containing 6 to 12 carbon atoms, their lower alkoxy derivatives and halogenated derivatives, Alk is a lower alkylene radical and NRR' is a member of the class consisting of lower dialkylamino, morpholino, pyrrolidino and piperidino radicals.

2. The aryloxyacetates of N,N-dialkyl-ω-aryl-ω-hydroxyalkylamines of the structural formula Ar-O-CH$_2$-COO-CH(Ar')-Alk-N(lower alkyl)$_2$ wherein Ar and Ar' are aryl hydrocarbon radicals containing 6 to 12 carbon atoms and Alk is a lower alkylene radical.

3. The phenoxyacetates of N,N-dialkyl-ω-phenyl-ω-hydroxyalkylamines of the structural formula C$_6$H$_5$-O-CH$_2$-COO-CH(C$_6$H$_5$)-Alk-N(lower alkyl)$_2$ wherein Alk is a lower alkylene radical.

4. The phenoxyacetate of α-diethylaminoethyl-benzyl alcohol.

5. The halogenated aryloxyacetates of N,N-dialkyl-ω-aryl-ω-hydroxyalkylamines of the structural formula

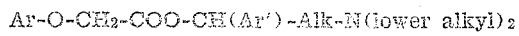

wherein Ar is a halogenated aryl radical containing 6 to 12 carbon atoms, Ar' is an aryl hydrocarbon radical containing 6 to 12 carbon atoms and Alk is a lower alkylene radical.

6. The chlorinated phenoxyacetates of N,N-dialkyl-ω-phenyl-ω-hydroxyalkylamine of the structural formula

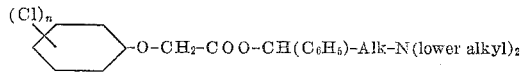

wherein Alk is a lower alkylene radical and n is an integer smaller than 3.

7. The chlorophenoxyacetates of N,N-dialkyl-ω-phenyl-ω-hydroxyalkylamine of the structural formula

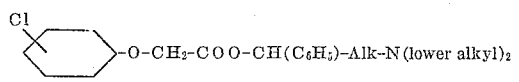

wherein Alk is a lower alkylene radical.

8. The chlorophenoxyacetates of α-diethylaminomethylbenzyl alcohol.

9. The dichlorophenoxyacetates of N,N-dialkyl-ω-phenyl-ω-hydroxyalkylamine of the structural formula

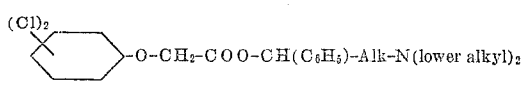

wherein Alk is a lower alkylene radical.

10. The o,p-dichlorophenoxyacetate of α-diethylaminomethylbenzyl alcohol.

11. The aryloxyacetates of N,N,N-trialkyl-(ω-aryl-ω-hydroxyalkyl)ammonium salts of the structural formula

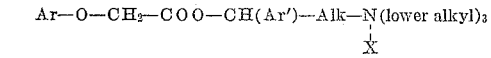

wherein Ar and Ar' are aryl hydrocarbon radicals containing 6 to 12 carbon atoms, Alk is a lower alkylene radical and X is one equivalent of an anion.

12. The phenoxyacetates of (β-hydroxy-β-phenethyl) trialkylammonium salts of the structural formula

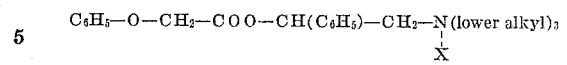

wherein X is one equivalent of an anion.

13. The halogenated aryloxyacetates of N,N,N-trialkyl - (ω - aryl-ω - hydroxyalkyl) ammonium salts of the structural formula

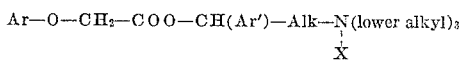

wherein Ar is a halogenated aryl radical containing 6 to 12 carbon atoms, Ar' is an aryl hydrocarbon radical containing 6 to 12 carbon atoms, Alk is a lower alkylene radical and X is one equivalent of an anion.

14. The chlorinated phenoxyacetates of (β-hydroxy-β-phenethyl) trialkylammonium salts of the structural formula

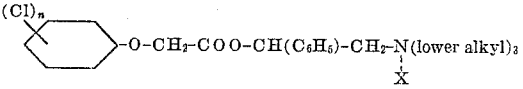

wherein X is one equivalent of an anion and n is an integer smaller than 3.

15. The o,p-dichlorophenoxyacetates of (β-hydroxy - β - phenethyl) diethylmethylammonium halides.

JOHN W. CUSIC.

REFERENCES CITED

The following references are of record in the file of this patent:

UNITED STATES PATENTS

| Number | Name | Date |
|---|---|---|
| 2,372,116 | Pierce et al. | Mar. 20, 1945 |
| 2,415,235 | Christiansen et al. | Feb. 4, 1947 |
| 2,428,978 | Martin et al. | Oct. 14, 1947 |

OTHER REFERENCES

McElvain et al.: Chem. Abstracts, vol. 41, col. 2047 (1947).